R. FLOCKE.

SATCHEL OR BAG FRAME.

No. 11,315. Reissued Mar. 21, 1893.

Witnesses

Oscar A. Michel.

W. H. Garrabrants

Inventor:

Robert Flocke,

By Drakeley & Co Atty's.

THE NORRIS PETERS CO., PHOTO-LITHO., WASHINGTON, D. C.

UNITED STATES PATENT OFFICE.

ROBERT FLOCKE, OF NEWARK, NEW JERSEY, ASSIGNOR TO GUSTAV BERNHEIM, OF NEW YORK, N. Y.

SATCHEL OR BAG FRAME.

SPECIFICATION forming part of Reissued Letters Patent No. 11,315, dated March 21, 1893.

Original No. 477,109, dated June 14, 1892. Application for reissue filed January 7, 1893. Serial No. 457,666.

*To all whom it may concern:*

Be it known that I, ROBERT FLOCKE, a citizen of the United States, residing at Newark, in the county of Essex and State of New Jersey, have invented certain new and useful Improvements in Satchel or Bag Frames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates more particularly to the hinge portion of a frame, the object being to cause the hinge when the frame is opened to its fullest extent or thereabout to automatically lock and hold itself in such position until the locking mechanism is released.

The invention consists in the improved hinge for satchel-frames and in the arrangement and combination of the several parts thereof and with the said frame, as herein set forth, and finally pointed out in the claims.

Figure 1:
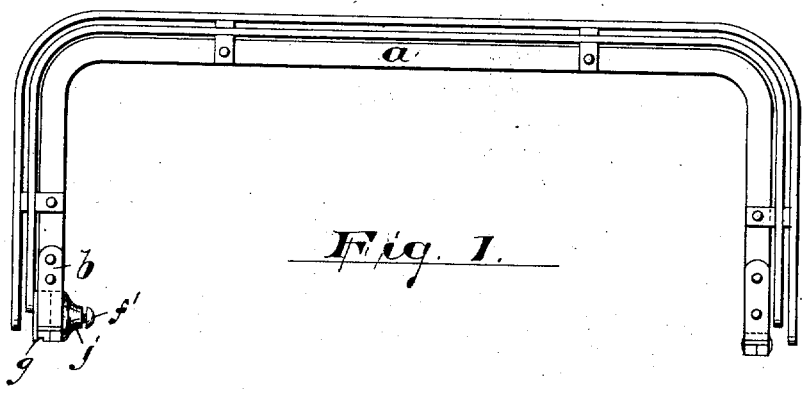
Figure 2:
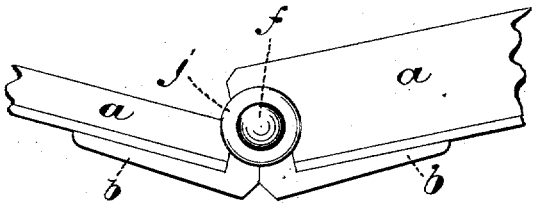
Figure 3:
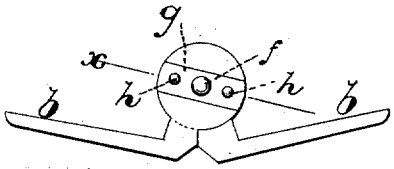
Figure 5:
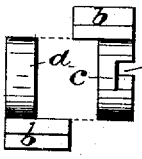
Figure 4:
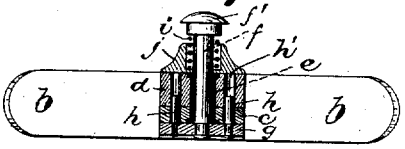
Figure 6:
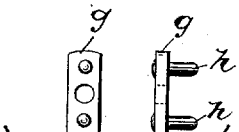
Figure 7:
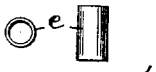

Referring to the accompanying drawings, in which similar letters of reference indicate corresponding parts in each of the several figures where they occur, Figure 1 represents in elevation a satchel-frame and a hinge connected therewith embodying my improvement. Fig. 2 represents in an end elevation the frame and hinge wide open, the frame being broken off near the hinge. Fig. 3 represents a similar view of the hinge detached from the frame and looking at it from the opposite side to that shown in Fig. 2. Fig. 4 represents, partly in plan, the hinge wide open, the central portion or working parts being shown in section, taken through line *x* of Fig. 3. Figs. 5, 6 and 7 are detail views of the working parts.

In said drawings, *a* indicates the satchel-frame, which is of the ordinary construction, and therefore needs no description.

*b* indicates the leaves of the hinge, which are connected to or with the frame in the ordinary manner. The portions or sides *c* and *d* of the knuckle or joint of the hinge are united by and work upon a hollow or tubular pintle *e*, the ends of which are turned outward or clinched upon the countersunk surfaces of the knuckles to prevent the parts from separating, as will be understood upon reference to the drawings, more particularly to Fig. 4 in which said pintle, &c., are shown by the heavy black or solid lines. Said pintle is also shown in end view and elevation in Fig. 7. Passing through said tubular pintle and working longitudinally therein is a rod *f*, upon which is secured a cross head or bar *g*, which fits into a groove or recess *g'*, Figs. 3, 4 and 5, in one side of the knuckle and carries one or more (in the present case two) inwardly-projecting pins *h*, which fit and work into corresponding apertures *h'*, formed in the opposite sides of the knuckle, as indicated in said Fig. 4. Said cross head or bar is also shown in plan and elevation in Fig. 6. Said apertures *h'* are so arranged in the opposite sides of the knuckle as that they coincide with one another only when the frame or hinge is fully opened, when the pins *h* under pressure of a spring *i* automatically enter the apertures in the side *d*, thereby locking and holding the hinge open until the pins are forced out again by pressing upon the head *f'* of the rod *f*, as will be readily understood upon reference to said Fig. 4. Said spring is located in a socketed head or washer *j*, through which the rod *f*, also passes, and bears against the bottom of said socket and the base of the head *f'* of said rod, as indicated in said Fig. 4. In closing the frame or hinge the pins upon being pushed back, as described, ride upon the inner surface of the side or part *d*, as will be understood.

By making the hinge as above described a very substantial lock is secured, as after the pins have entered the openings in the two sides of the knuckle the only way to close the hinge without removing the pins is to cut them in two by moving the knuckles upon each other, which of course is impossible. If, however, the rod had one pin at one end to engage with one side of the knuckle and another pin at the other end to engage with the other side, the only thing to prevent the sides of the knuckles from turning upon each other and closing the satchel would be the torsional strength of the rod. With as small a rod as must be used to prevent the hinge from being too large and cumbersome the torsional strength of the rod is not sufficient to make a very strong lock, and especially with as much leverage as is exerted by force applied to the outer portion of the frame, with the pins or locks almost forming a portion of the fulcrum or rod; but in making the sides of the knuckles with the perforations parallel with the pintle it becomes necessary to provide a socket for the spring upon the exterior of the hinge to avoid making the parts too large, which is accomplished by the socketed head or washer *j* at one end of the hinge, and it is also necessary to secure the sides of the knuckles so that they cannot move away from each other, which would permit of the portions of the pins between them being bent by any strain brought upon them by trying to close the satchel. To avoid this and have a neat strong lock and hinge, resort is had to the tubular pintle, which, while it affords a bearing for the sides of the knuckles and also for the rod, also holds the sides of the knuckles so tightly as to prevent any possibility of their separating and bending their locking-pins, as above described.

I have shown herein my self-locking hinge attached to one end only of the frame, which in ordinary practice is sufficient, though it may be applied to both ends, if desired; and I reserve the right to make such changes in the construction of the different parts as will come within the spirit of my invention.

Having thus described the invention, what I claim, and wish to secure by Letters Patent of the United States, is—

1. In a hinge or satchel-frame, the combination, with the leaves, each of which is provided with perforations parallel with the central or hinge perforation, of a tubular pintle through the central opening of the leaves, a spring-actuated rod through the pintle, a cross-head on the rod, and pins in the cross-head, the inner ends of which are adapted to enter the holes in the leaves and lock the hinge, substantially as set forth.

2. The combination, with the hinge of a satchel-frame, of a tubular pintle, a socketed head or washer upon one side of the knuckle of the hinge and a recess or groove in the other, a spring-actuated rod passing through said socketed head and pintle, and means connected with said rod for automatically locking the hinge when the latter is open, as described, and for the purposes set forth.

3. In a hinge for a satchel-frame, the combination with the leaves, having perforations arranged parallel with the central or hinge perforation, of a tubular pintle passing through the central opening of the leaves, a spring-actuated rod arranged in said tubular pintle, and means in connection with said rod for engaging with the holes in the leaves and locking the hinge, as described and for the purposes set forth.

In testimony that I claim the foregoing I have hereunto set my hand this 20th day of December, 1892.

ROBERT FLOCKE.

Witnesses:

OLIVER DRAKE,

OSCAR A. MICHEL.